(12) United States Patent
Turk

(10) Patent No.: US 8,576,801 B2
(45) Date of Patent: Nov. 5, 2013

(54) RADIO MEASUREMENTS IN CELLULAR TELECOMMUNICATION SYSTEMS

(75) Inventor: John P Turk, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 804 days.

(21) Appl. No.: 12/048,703

(22) Filed: Mar. 14, 2008

(65) Prior Publication Data

US 2008/0225801 A1    Sep. 18, 2008

(30) Foreign Application Priority Data

Mar. 14, 2007   (GB) .................................. 0704910.9

(51) Int. Cl.
*H04W 4/00*        (2009.01)
(52) U.S. Cl.
USPC ............ 370/332; 370/331; 455/436; 455/437
(58) Field of Classification Search
USPC ......... 370/330, 332, 331, 333, 334, 335, 336, 370/337, 338; 455/436, 437, 438, 525, 455/67.1, 226.2
See application file for complete search history.

(56) References Cited

U.S. PATENT DOCUMENTS

| 5,170,485 | A |   | 12/1992 | Levine |         |
|-----------|---|---|---------|--------|---------|
| 5,367,559 | A |   | 11/1994 | Kay et al. | |
| 5,379,446 | A | * | 1/1995  | Murase | ........................ 455/444 |
| 6,049,715 | A | * | 4/2000  | Willhoff et al. | ............... 455/436 |
| 2007/0183344 | A1 | * | 8/2007 | Joshi | ............................. 370/254 |
| 2008/0043672 | A1 | * | 2/2008 | Sebire et al. | ................. 370/331 |

FOREIGN PATENT DOCUMENTS

| EP | 0 685 974 | 12/1995 |
| GB | 2 263 377 | 7/1993 |
| WO | 91/19403 A1 | 12/1991 |

OTHER PUBLICATIONS

European Search Report issued on Apr. 13, 2011 in corresponding European Patent Application No. 08102604.9.

* cited by examiner

*Primary Examiner* — Dady Chery
(74) *Attorney, Agent, or Firm* — Workman Nydegger

(57) ABSTRACT

A method of assessing for a mobile terminal 1 the suitability of a cell of a cellular telecommunications network includes measuring the radio signal at the mobile terminal 1—step A; and calculating at least one of a first mean value of a plurality of the radio signal measurements over a first time period—step B—and a second mean value of a plurality of the radio signal measurements over a second time period, longer than the first time period—step D. Two different thresholds are provided. The or each mean value is compared to one or respective ones of the thresholds—steps C and E. If the or either of the mean values are below the or the respective threshold, then this indicates that the cell might not be suitable for the mobile terminal. In that instance, a cell reselection process—step F—or a cell handover process can be triggered. By providing two mean values and two different thresholds, it is possible to provide improved sensitivity to variations in the radio signal as a result of the mobile terminal moving quickly within a cell and less sensitivity to fluctuations of the radio signal at a mobile terminal that is substantially stationary and which are due to "fading".

26 Claims, 6 Drawing Sheets

RADIO MEASUREMENTS IN CELLULAR TELECOMMUNICATION SYSTEMS

The present invention relates to methods of obtaining information for assessing for a mobile terminal the suitability of a cell of a cellular telecommunications network. Apparatus for performing such a method is also provided.

Mobile networks such as 2G (GSM) or 3G (UMTS) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Typically, the filter speed/length (averaging period) and the threshold value are provided to all mobile terminals in the same cell.

The values selected for the filter speed/length (averaging period) and the threshold are a compromise. A very fast/short filter (short averaging period) will be undesirably sensitive to signal fading that occurs even when a mobile terminal is stationary due to random (Raleigh) fluctuations of the radio levels. This has been found to occur particularly for mobile terminals camped or registered on a 3G base station, and in the prior art causes reselection to a 2G base station even in a location of good 3G coverage. However, if the filter is slowed/lengthened (the averaging period increased) to reduce sensitivity to the fluctuations over a period when the mobile terminal is stationary, in the prior art the cell reselection/handover process would be triggered too slowly and would result in dropped calls/slow call setup when the mobile terminal was fast moving, such as when travelling at motorway speeds.

Embodiments of the present invention seek to overcome or mitigate these disadvantages of the prior art and provide an improved arrangement for triggering cell reselection/handover.

According to a first aspect of the present invention, there is provided a method of obtaining information for assessing for a mobile terminal the suitability of a cell of a cellular telecommunications network, the method including: measuring a radio signal of the cell at the mobile terminal; calculating at least one of a first average value of a plurality of the radio signal measurements of the cell over a first time period and a second average value of a plurality of the radio signal measurements of the cell over a second time period, longer than the first time period; and comparing the or each calculated average value to an event trigger parameter or to one or more event trigger parameters.

The event trigger parameter with which the first average value is compared is different from the event trigger parameter with which the second average value is compared.

The method may calculate both the first average value and the second average value. Alternatively, either the first average value or the second average value only may be calculated in dependence upon a mobility assessment of the mobile terminal. Such a mobility assessment may determine whether the mobile terminal is considered to be "fast moving" or "slow moving".

The calculated average values are preferably (arithmetical) mean values but could be any other type of average—for example, mode or median.

According to a second aspect of the present invention, there is provided a method of obtaining information for triggering mobility events in a cellular telecommunications network, the method including:
 measuring a radio signal from the cell at the mobile terminal;
 applying at least one of a fast filter to the radio signal measurement to generate a fast filter output and a slow filter to the radio signal measurement to generate a slow filter output;
 comparing the or each filter output to an event trigger parameter or to an associated event trigger parameter.

In the embodiments of the invention, the fast filter and the associated event trigger parameter may be configured to be responsive to fast movement in the mobile terminal within the cell. The slow filter and the associated event trigger parameter may be configured to be responsive to slow movement of the mobile terminal within the cell and to be non-responsive to signal fade or Raleigh fluctuations at a substantially stationary mobile terminal. By providing the two different filters and associated event trigger parameters, detection of a slow moving mobile terminal and a fast moving mobile terminal can be performed reliably but without over-sensitivity to signal fade or Raleigh fluctuations. This is a significant improvement over the prior art.

The second aspect of the present invention, like the first aspect above, may, in response to the comparison step trigger a mobility event, such as cell selection, reselection or handover event.

The invention also provides apparatus as defined in the independent claims.

For a better understanding of the present invention embodiments will now be described by way of example, with reference to the accompanying drawings, in which.

Figure 6:
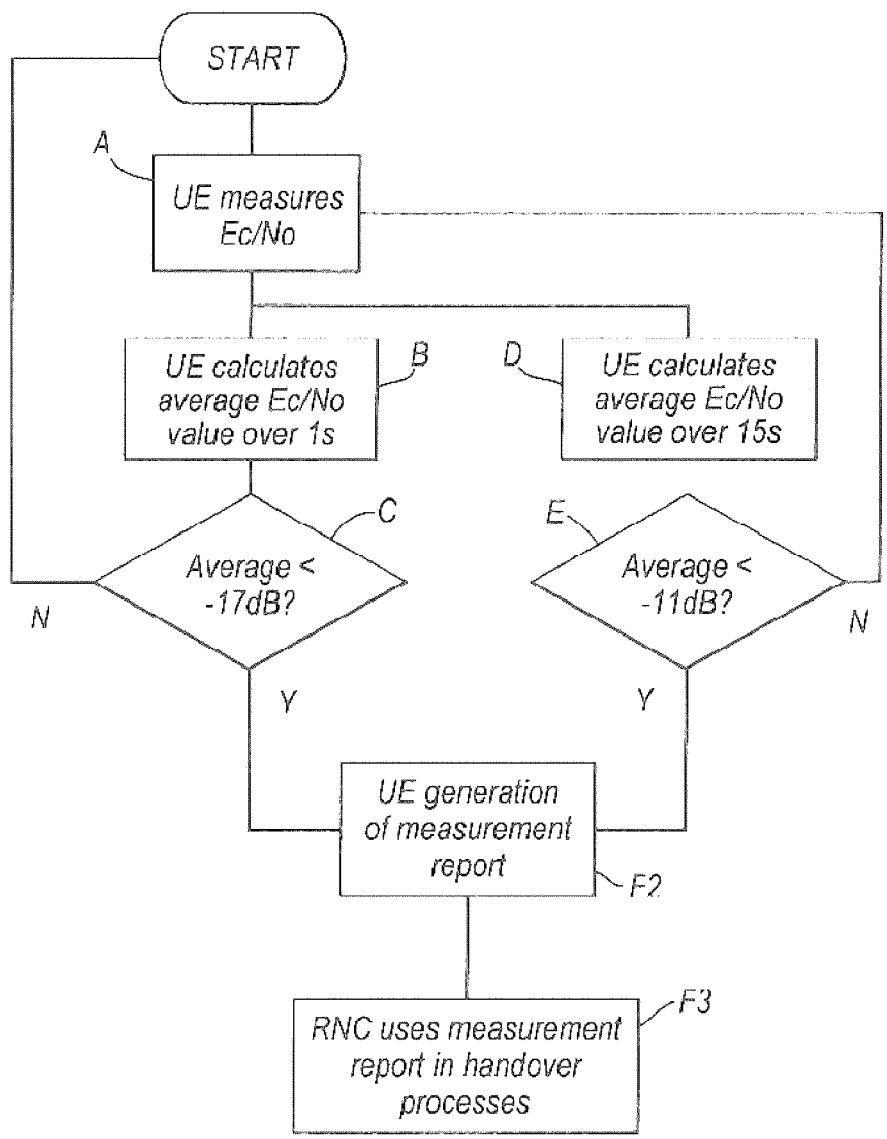
Figure 7:
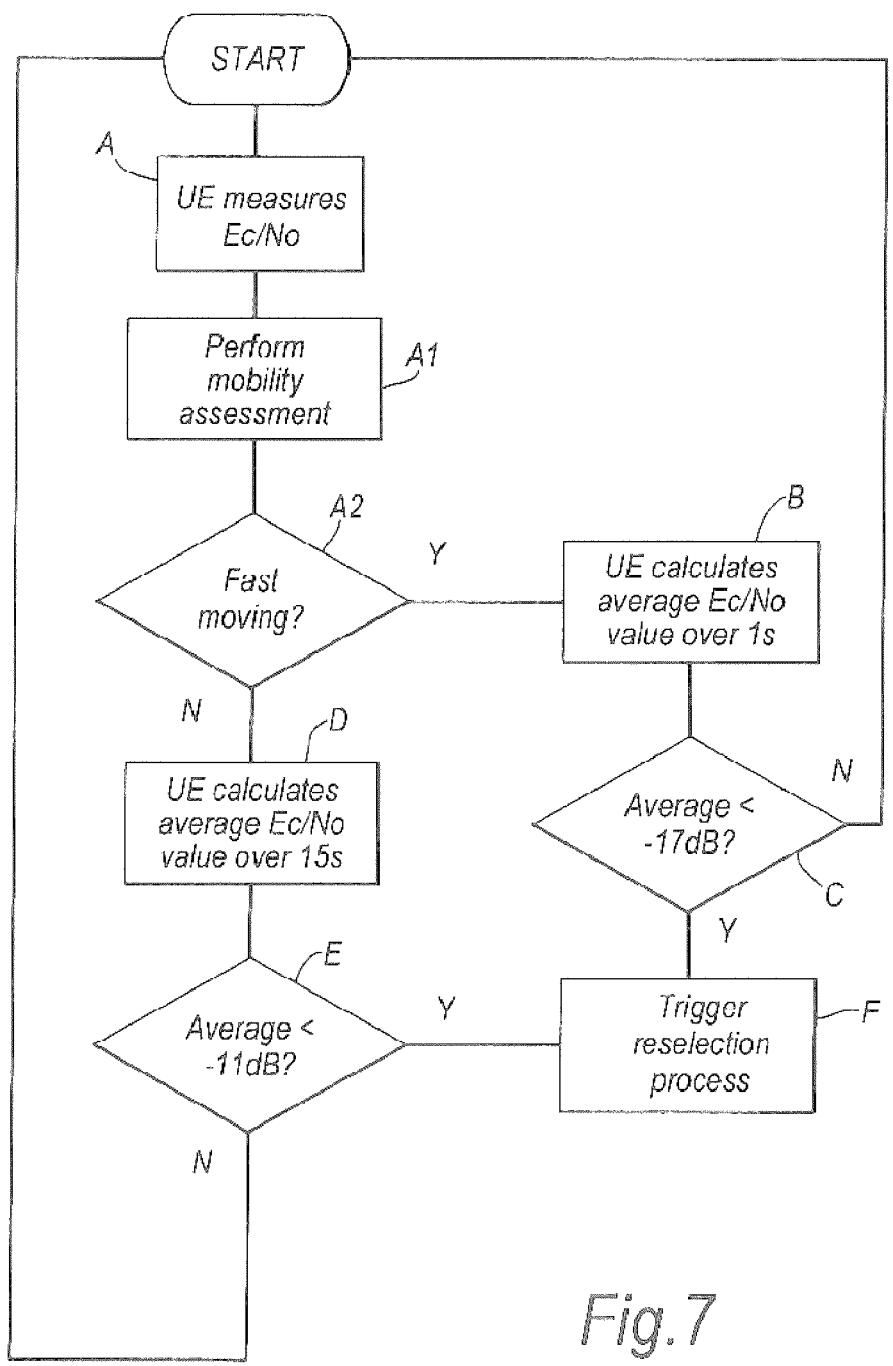

FIG. 6 is a flow chart showing the calculation of the first mean value and the second mean value in comparison with the associated thresholds in order to determine when to trigger handover processes for a mobile terminal registered with a 3G cell; and FIG. 7 shows a flow chart according to an alternative embodiment of the invention where a mobility assessment step is performed which is used to select whether to perform either the first mean value calculation or the second mean value calculation (and comparison with the relevant associated threshold), in order to trigger reselection processes.

In the drawings like elements are generally designated with the same reference sign.

Key elements of a mobile telecommunications network n, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 2 and a base station controller (BSC) 4. A BSC may control more than one BTS. The BTSs and BSCs comprise the radio access network.

In a UMTS (3G) mobile telecommunications network, a radio network controller (RNC) 13 may control more than one node B 6. The node B's and RNC's form base station 7 and comprise the radio access network.

Conventionally, the base stations are arranged in groups and each group of base stations is controlled by one mobile switching centre (MSC), such as MSC 2 for base stations 3,4 and 5, and MSC 6, for base stations 7,8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 7 associated with the particular cell in which the terminal 1 is located. In a traditional network, the base station 7 then transmits this IMSI to the MSC 6 with which the BS 7 is registered. In a network using the functionality described in 3GPP TS 23.236, the base station follows prescribed rules to select which MSC to use, and then transmits this IMSI to the selected MSC.

MSC 6 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 6), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 6. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 6 in the manner described above, the HLR 10 additionally performs an authentication procedure for the mobile terminal 1. The HLR 10 transmits authentication data to the MSC 2 in "challenge" and "response" forms. Using this data, MSC 6 passes a "challenge" to the mobile terminal 1 through base station 7. Upon receipt of this data, the mobile terminal 1 passes this data to its SIM and produces a "response". This response is generated using an encryption algorithm on the SIM and a unique Ki on the SIM. The response is transmitted back to the MSC 6 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 6 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 6 and MSC 2) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 7 and passed on to the MSC 6. The MSC 6 routes the calls towards the called party via the MSC 6. By means of the information held in the VLR 14, MSC 6 can associate the call with a particular subscriber and thus record information for charging purposes.

The MSCs 6 and 2 support communications in the circuit switched (CS) domain—typically voice calls. Corresponding SGSNs 16 and 18 are provided to support communications in the packet switched (PS) domain—such as GPRS data transmissions. The SGSNs 16 and 18 function in an analogous way to the MSCs 6 and 2. The SGSNs 16, 18 are equipped with an equivalent to the VLR for the packet switched domain. GGSN 19 provides IP connectivity for the CN 12, for example to Packet Data Network 20 (such as the Internet).

Figure 1:
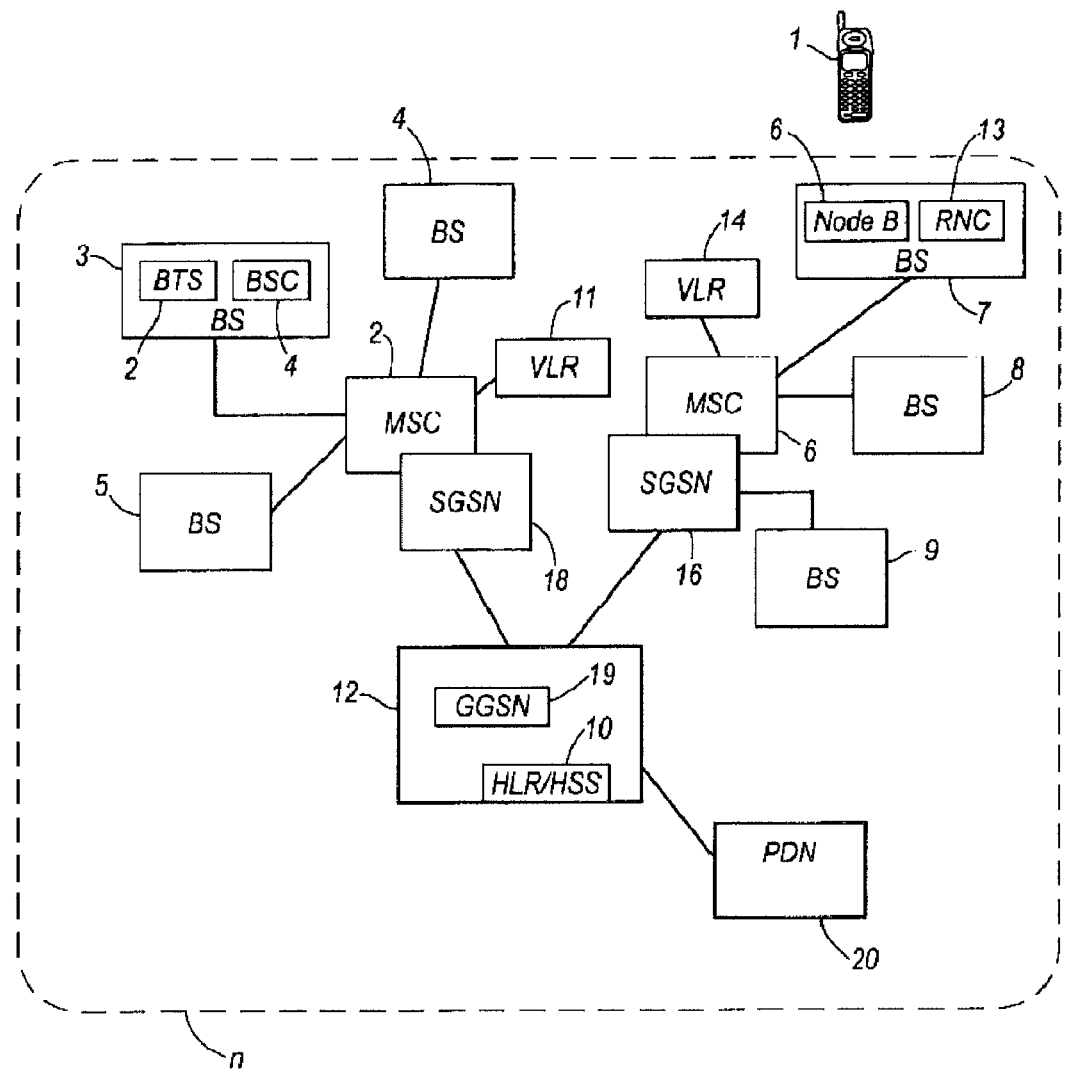
FIG. 1 is a diagrammatic drawing of key elements of a mobile telecommunications network for use in explaining the operation of such a network.

The network of FIG. 1 includes two Radio Access Technologies (RATs): 2G(GSM) and 3G(UMTS).

From the description above, it will be understood that the coverage area of a mobile telecommunications network is divided into a plurality of cells, each of which is served by a respective base station.

A mobile terminal has an active mode and an idle/inactive mode. In the idle/inactive mode a mobile terminal "camps" on what is determined to be the best cell. As the mobile terminal moves around, the best cell changes and cell reselection is performed by the mobile terminal to change the cell on which the mobile terminal is camped.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received.

Having just discussed the idle/inactive mode, the active mode will now briefly be discussed. In the active mode, in order to allow a mobile terminal to maintain a call when the mobile terminal moves outside the coverage area of a cell, the call must be switched to an alternative cell automatically. This process is referred to as "handover". The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL-DCH and thus excluding CELL/URA-PCN RRC connected mode status.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

The RRC states will now briefly be described.

For a 3G mobile terminal, in the active mode the terminal is in the RRC connected mode. The RRC connected mode includes the following states:

CELL_DCH state is characterized by:
    A dedicated physical channel is allocated to the UE in uplink and downlink.
    The UE is known on cell level according to its current active set
    Dedicated transport channels, downlink and uplink (TDD) shared transport channels and a combination of these transport channels can be used by the UE.

CELL_FACH state is characterized by:
    No dedicated physical channel is allocated to the UE.
    The UE continuously monitors a FACH (forward access channel) in the downlink.
    The UE is assigned a default common or shared transport channel in the uplink (e.g. RACH) that it can use anytime according to the access procedure for that transport channel.
    The position of the UE is known by UTRAN on cell level according to the cell where the UE last made a cell update.
    In TDD mode, one or several USCH or DSCH transport channels may have been established.

CELL_PCH state is characterized by:
    No dedicated physical channel is allocated to the UE. The UE selects a PCH (paging channel) with the algorithm, and uses DRX for monitoring the selected PCH via an associated PCH.
    No uplink activity is possible.
    The position of the UE is known by UTRAN on cell level according to the cell where the UE last made a cell update in CELL_FACH state.

URA_PCH state is characterized by:
    No dedicated channel is allocated to the UE. The UE selects a PCH, and uses DRX for monitoring the selected PCH via an associated PCH.
    No uplink activity is possible.
    The location of the UE is known on UTRAN routing area level according to the URA assigned to the UE during the last URA update in CELL-FACH state.

In the CELL_DCH state a network-driven handover is performed when necessary, as described in 3GPP TS 25-331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal 1 provides a measurement of a neighbour cell received signal at the mobile terminal 1 below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS 05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells. Information from the neighbouring cells is broadcast in the system information block 11 (SIB11) or system information block 12 (SIB12) of the broadcast channel (BCH) as described in 3GPP TS 25.304 and 3GPP TS 25.331.

Many mobile network systems in accordance with the UMTS standard are designed such that they use several frequencies and the development of the cells occurs in small cells ("micro-cells") and larger cells ("macro-cells"). In general, this type of arrangement is called "hierarchical cell structure" (HCS) in cellular networks. This arrangement is described in 3GPP TS 25.304.

In HCS slow-moving or stationary mobile terminals should be located in the smallest possible cells, such as micro-cells, while (faster) moving mobile terminals are preferably located in larger cells, such as macro-cells. This reduces the number of cell switches for faster moving mobile terminals. In order to identify whether a mobile terminal is moving or stationary, HCS uses the determination of the number of cell changes (parameter NCR) over a specified period of time (parameter TCR) as described, for example, in WO-A-2001043462.

Both parameters NCR and TCR are reported to the mobile terminal via the BCH (in SIB3 or 4) in each cell and the mobile terminal decides using the number of cell changes (NCR) in time period (TCR) whether it is in a so-called "low-mobility" or "high-mobility" state. If the mobile terminal is in a "low-mobility" state, it favours a cell change in smaller cells (micro-cells) and in a "high-mobility" state, it favours larger cells (macro-cells). The result of this behaviour is that the number of cell changes for fast-moving mobile end devices is minimised, whereby the capacity of the mobile network is maximised overall.

In non-HCS networks there are also mechanisms to determine the mobility state of a mobile terminal. For example, again, the number of cell changes (NCR) over a specified period of time (TCR) can be used, or the degradation of received pilot channel power within a given time period being above a threshold can be used. Other methods are also possible.

The embodiments of the invention now to be described in more detail provide an improved arrangement for determining when to trigger cell reselection and/or cell handover processes. That is, the embodiments concern measuring the cell on which a mobile terminal is currently registered/camped to assess whether that cell is no longer suitable for use by that mobile terminal. If the power and/or quality of the radio signal received at the mobile terminal for that cell becomes relatively low compared to a neighbouring cell then it is appropriate to trigger the cell handover/reselection processes. In those processes the power and/or quality of the neighbouring cells is evaluated in the manner described above. If a neighbouring cell provides improved radio quality, then the handover/reselection process can be completed in a conventional manner, also briefly described above.

A first embodiment of the invention will now be described in relation to the flow chart of FIG. 2. This embodiment provides an improved mechanism for deciding whether to trigger a cell reselection process.

At step A the mobile terminal (UE) 1 measures the energy per chip (Ec) received by the mobile terminal 1 and the spectral noise power density (No) received by the mobile terminal 1 on the current pilot channel (CPICH) transmitted by the base station 7 of the cell on which the mobile terminal 1 is currently camped. The ratio Ec/No is determined. These measurements and ratio determination are performed frequently at regular time intervals, for example ten times per second. Alternatively, RSSI or path loss may be measured.

A processor within the mobile terminal 1 calculates at step B the average (mean) Ec/No value over a one second time period (the "first time period"). This averaging process applies a fast filter to the measured Ec/No values from step A.

At step C the processor of the mobile terminal determines whether the average calculated at step B is below a first "low" threshold of −17 dB.

If the average value of Ec/No is not less than −17 dB, then the process returns to step A.

At step D, the mobile terminal calculates the average mean Ec/No value over a time period of fifteen seconds (the "second time period"). This averaging process applies a slow filter to the measured Ec/No values from step A.

At step E it is determined whether the average value of Ec/No calculated at step D is less than the second "high" threshold of −11 dB. If the average is not less than −11 dB, then the process returns to step A.

Steps B and C, and D and E are performed concurrently.

If at step C the average value of Ec/No over a period of one second (the first time period) is determined to be less than the first threshold of −17 dB, or if at step E the average value of Ec/No over fifteen seconds (the second time period) is determined to be less than the second threshold of −11 dB, then at step F a cell reselection process is triggered. The processes performed at step F may be conventional. For example, the quality of the radio signals from neighbouring cells may be compared to the current cell on which the mobile terminal 1 is camped. If the neighbouring cell is determined to have an improved radio signal quality compared to the current cell, then cell reselection may be performed.

By calculating a first average value of Ec/No over a relatively short time period (one second) and comparing this to a first, relatively low threshold, a cell reselection process will be triggered promptly when a mobile terminal is fast moving.

On the other hand by calculating the second average value of Ec/No over a relatively long time period (15 seconds) and comparing this to a second, relatively high threshold, a cell reselection process will be performed for a slow moving mobile terminal but will tend not to be triggered by short-term changes in the radio field conditions—so called "fading". This occurs due to random (Raleigh) fluctuations of the signals received from the base station 7 of the cell in which the mobile terminal 1 is currently registered.

The process performed in FIG. 2 can also be explained as follows.

A mobile terminal camped on a 3G cell makes Ec/No measurements of that cell periodically. The network signals the following parameters to the mobile, with example values given:

Treselection=1 s, Treselection_slow=15 s, Reselection_Threshold=−17 dB, Reselection_Threshold_slow=−11 dB If the averaged Ec/No measurements are worse than Reselection_Threshold for the period Treselection, then the process for reselection (e.g. from 3G to GSM) is triggered.

At the same time, if the averaged Ec/No measurements are worse than Reselection_Threshold_slow for the period Treselection_slow, then the process for reselection (e.g. from 3G) to GSM is triggered.

This can be described alternatively, using the example values, thus:
IF
    [(Ec/No_average <−17 dB) for 1 s] OR [(Ec/No_average <−11 dB) for 15 s]
THEN
    [Trigger reselection process].

Figure 2:
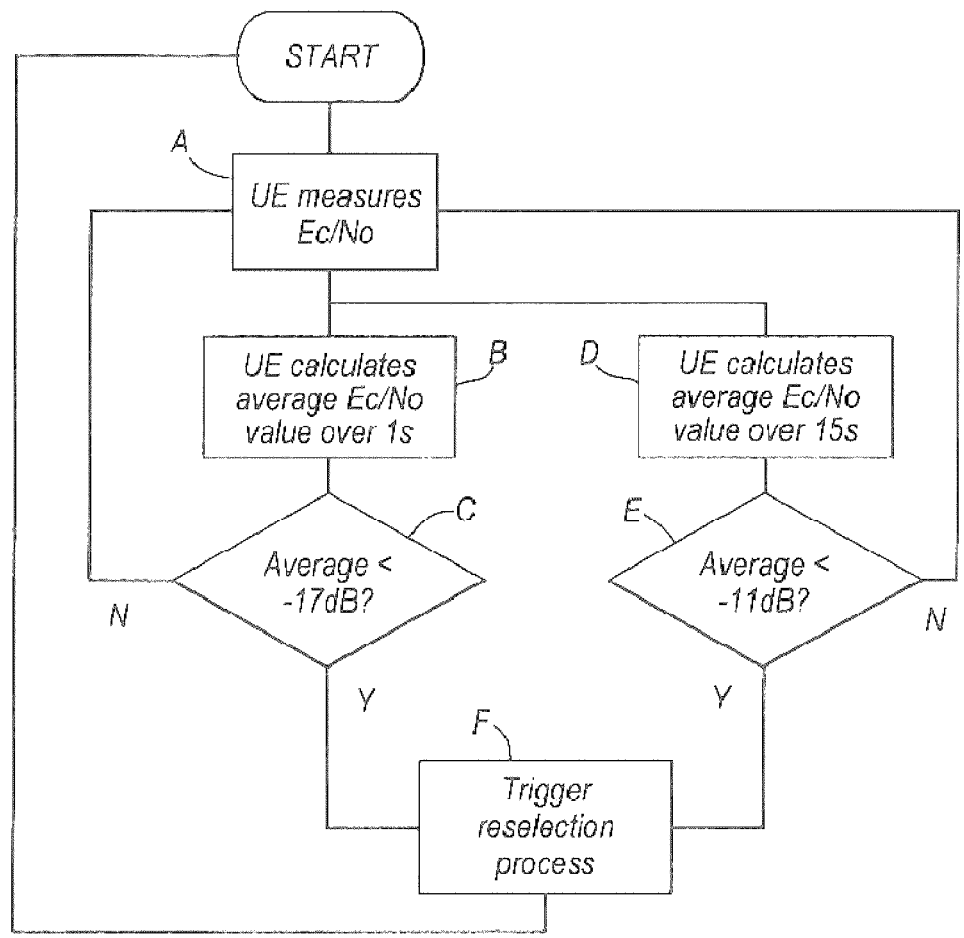
FIG. 2 shows a flow chart explaining a first embodiment of the invention where a first mean value of radio signal measurements and a second mean value of radio signal measurements are calculated and compared to respective thresholds in order to determine whether to trigger reselection processes.
Figure 3:
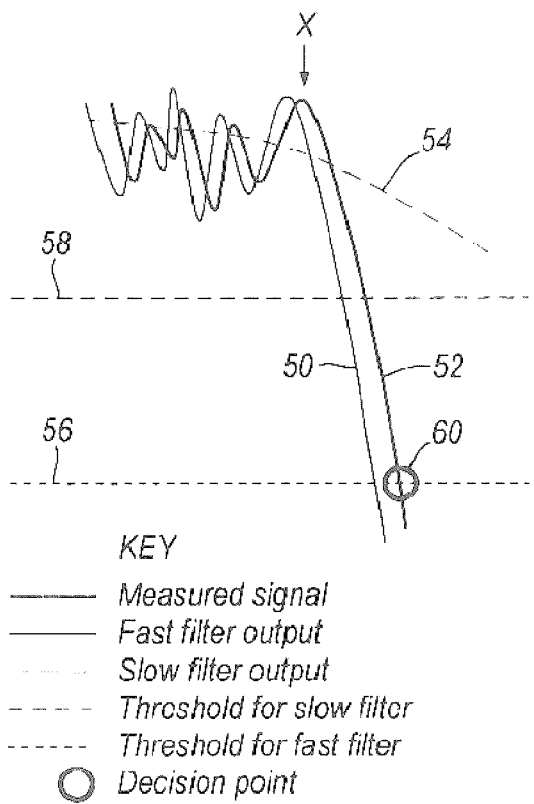
FIG. 3 shows a graph of the measured radio signal at the mobile terminal, the calculated first mean value and the calculated second mean value, and the respective thresholds when a mobile terminal is fast moving.

The graph of FIG. 3 shows the value of Ec/No in the vertical axis (measured in dB) and time in the horizontal axis. Plot 50 shows the measured value of Ec/No at a particular time (that is, the instantaneous value of Ec/No without any averaging)—obtained at step A of FIG. 2.

Plot 52 shows the fast filter output determined by calculating the average of Ec/No over a period of one second at step B of FIG. 2. Plot 54 shows the output of the slow filter obtained by calculating the average of Ec/No over a period of fifteen seconds at step D. The first threshold value (used in step C) is shown at 56 and the second threshold value (used at step E) is shown at 58. The trigger reselection process at step F is performed when the fast filter output falls below the fast filter "low" threshold (the first threshold), as indicated at decision point 60, or when the slow filter output 54 falls below the slow filter "high" threshold (the second threshold) 58.

In FIG. 3 the Ec/No value reduces rapidly at time X—which is indicative of the mobile terminal 1 moving quickly towards the edge of the current cell. Steps B and C respond to this rapid change only when the output 52 of the fast filter crosses the "low" threshold 56, so that rapid variations that do not cross this threshold do not trigger the reselection processes (step F). In this scenario the slow filter output 54 and associated threshold 58 are not sufficiently responsive to detect the mobile terminal 1 heading for the edge of the current cell—risking loss of coverage.

Figure 4:
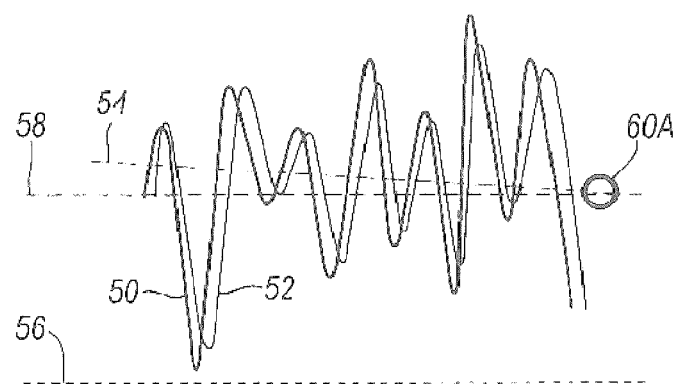
FIG. 4 is a plot of the same parameters as FIG. 3 but for a relatively slow moving mobile terminal.

FIG. 4 shows how the measured Ec/No value 50, the fast filter output 52 and the slow filter output 54 vary with respect to the first threshold 56 and the second threshold 58 when the mobile terminal has a different mobility pattern. In FIG. 4 the mobile terminal is slow moving. The high frequency variations in the Ec/No measurements are due to short-term changes in the radio field conditions—so called "fading". This occurs due to random (Raleigh) fluctuations of the signals received from the base station 7 of the cell in which the mobile terminal 1 is currently registered.

However, in FIG. 4 the cell reselection processes (step F) are triggered when the output of the slow filter 54 falls below the slow filter threshold 58, as indicated by decision point 60A. This cell reselection process is triggered in response to a long term reduction in the average value of the Ec/No value—indicating slow movement towards the edge of the cell.

Figure 5:
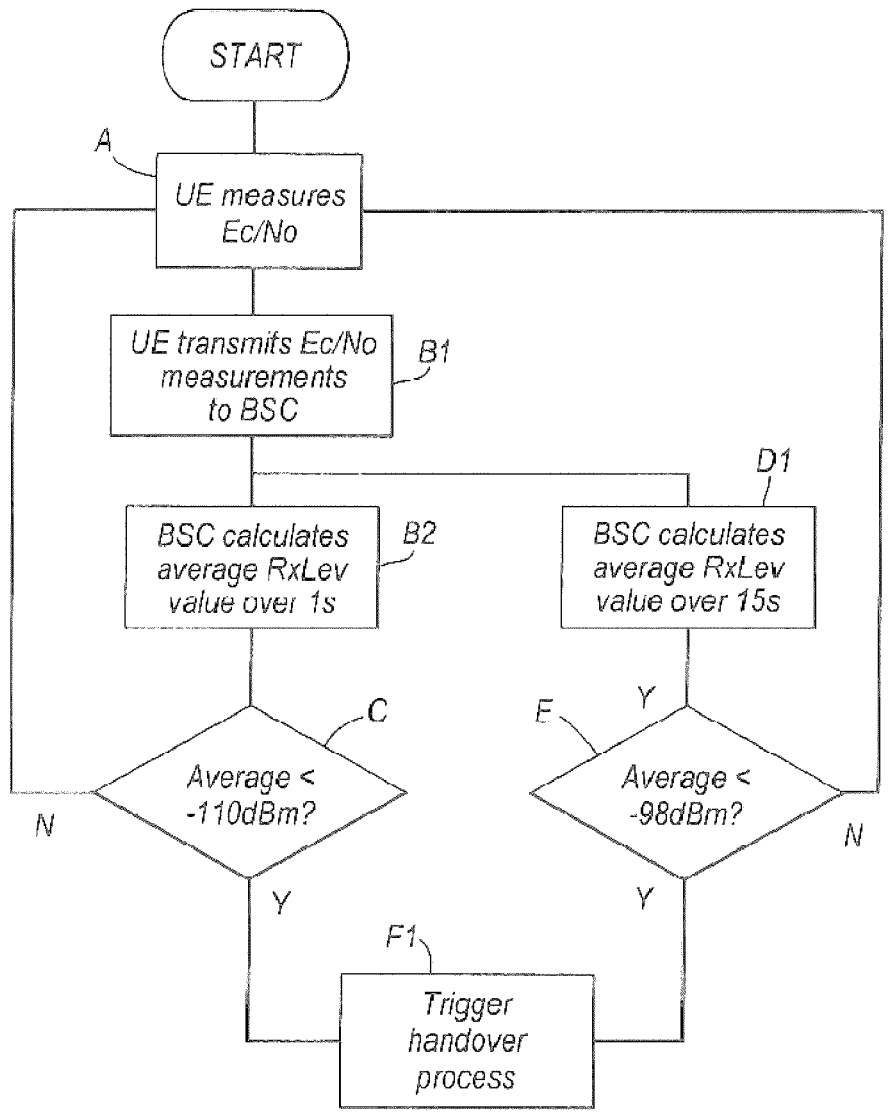
FIG. 5 is a flow chart showing the mean value calculations and threshold comparisons performed in order to decide whether to trigger handover processes from a 2G cell.

FIG. 5 shows a second embodiment of the invention, which provides improved triggering of a handover process in a 2G RAT (as opposed to the cell reselection process described in relation to FIG. 2).

At step A of FIG. 5 the mobile terminal 1 measures the received signal strength (RxLev). At step B1 the mobile terminal 1 transmits the RxLev measurement made at step A to the 2G BSC 4 via the BTS 2. At step B2 the BSC 4 calculates the average RxLev value over a period of one second (the first time period). That is, the fast filter is applied.

At step C it is determined whether this average calculated at step B2 is less than the first "low" threshold −110 dBm (in a corresponding manner to step C of FIG. 2).

If the average is not less than −110 dBm then, the process returns to step A.

At step D1 the BSC 4 calculates the average RxLev value over a time period of 15 seconds.

At step E it is determined whether the average calculated in step D1 is less than the second "high" threshold −98 dBm. If the average calculated at step E is not below −98 dBm the process returns to step A.

Steps B2 and C, and D1 and E are performed concurrently.

If at step C it is determined that the first time period average value is less than −110 dBm, or if at step E it is determined that the second time period average value is less than −98 dBm, then at step F1 the BSC 4 triggers a handover process. This handover process may be a conventional handover process. For example, a handover process triggered might cause the BSC 4 to obtain from the mobile terminal 1 indications of the radio quality from neighbouring cells and the cell with which the mobile terminal 1 is currently registered. This enables the BSC 4 to determine whether a neighbouring cell provides better radio signal quality than the current cell. If such a determination is made, then handover can occur to that neighbour cell that provides better quality in the conventional manner.

FIG. 5 provides improvements in handover triggering in a similar manner to the improvement in cell reselection triggering of FIG. 2.

FIG. 6 shows how the handover process is triggered by a mobile terminal currently registered with a 3G RAT.

At step A mobile terminal 1 measures the Ec/No value in a similar manner to step A of FIG. 2.

At step B the mobile terminal 1 calculates the average Ec/No value over a period of one second (the first time period), in a similar manner to step B of FIG. 2.

At step C it is determined whether the average value calculated at step B is less than the first "low" threshold, −17 decibels. If the average value is not less than −17 decibels the process returns to step A.

The mobile terminal 1 calculates the average Ec/No value over a 15 second period (the second time period) at step D. At step E it is determined whether the average calculated at step D is less than the second "high" threshold, −11 decibels. If the average is not less than −11 decibels then the process returns to step A.

Steps A and B, and C and D are performed concurrently.

If it is determined at step C that the average over the first time period is below −17 decibels, or if it is determined at step E that the average over the second time period is below −11 decibels, then at step F2 the mobile terminal 1 triggers generation of a measurement report for use in a handover request to the RNC 3 via the node B 6 of the base station 7 with which the mobile terminal 1 is currently registered.

At step F3 the RNC 3 uses the measurement report in a conventional handover processes. The embodiment may be used to determine when to trigger "Event 3a" as defined in TS 25.331 (which is hereby fully incorporated by reference) at step 3.

FIG. 7 shows an alternative arrangement for triggering the cell reselection process. This should be contrasted with the FIG. 2 arrangement. In the FIG. 2 arrangement the average Ec/No value over 1 second and the average Ec/No value over 15 seconds is always calculated at steps B and D. These averages are then compared to the first threshold (−17 dB) and a second threshold (−11 dB).

In FIG. 7 the mobile terminal 1 measures Ec/No at step A in a similar manner to step A of the flow charts of FIGS. 2 and 6. At step A1 the mobile terminal 1 performs mobility assessment. That is, the mobile terminal 1 or network or determines whether the mobile terminal 1 is fast moving or slow moving—for example, using the HCS or non-HCS methods briefly described above and known to those skilled in the art, or by a different method, such as Doppler measurements.

If it is determined at step A2 that the mobile terminal 1 is fast moving, then the mobile terminal 1 calculates the average Ec/No value over 1 second (the first time period) at step B, in a similar manner to step B of FIG. 2. If it is determined at step C that the average value calculated at step B is not less than the first "low" threshold, the process is repeated. If it is determined at step C that the average value calculated at step B is less than the "low" −17 dB threshold, then a cell reselection process is triggered at step F (in a similar manner to step F of FIG. 2).

However, if it is determined at step A2 that the mobile terminal is not fast moving (i.e. it is slow moving), the mobile terminal 1 calculates the average Ec/No value over 15 seconds (the second time period) at step D, in a similar manner to step D of FIG. 2. At step E it is determined whether the average value calculated at step D is less than the second "high" threshold, −11 decibels, in a similar manner to step E of FIG. 2). If it is determined at step E that the average is not less than −11 decibels, then the process is repeated. However, if at step E it is determined that the average value is less than −11 dB, then a cell reselection process is triggered at step F.

In the FIG. 7 embodiment, due to the mobility assessment at step A1, the most appropriate average calculation filter (step B or D) can be selected at step A2. Only that average calculation filter and the associated threshold detection then needs to be applied.

Although FIG. 7 relates to triggering a cell reselection process, it should be understood that the embodiments of FIGS. 5 and 6 which describe a cell handover process trigger can also be adapted to include a mobility assessment step (like step A1) and a decision whether the mobile terminal 1 is fast moving or slow moving (step A2), so that only one of the averages/filters is applied and compared only to the appropriate threshold.

In the embodiments described above, the output of fast and slow filters for a cell are compared with low and high (fixed) thresholds for example to trigger inter-RAT reporting Event 3a in TS 25.331.

Alternatively, the output of fast and slow filters applied to a first cell and a second cell may be compared—for example to determine whether the second cell enters the reporting range (i.e. when the measurement quality of the second cell is within a predetermined range from the best cell (the first cell)) and to trigger a measurement reporting event when this occurs. Different reporting ranges from the best cell are used for the fast filter output and the slow filter output. The event triggered may be for example Event 1a as defined in TS 25.331.

The embodiments provide improved triggering of measurement reporting events. The measurement reporting events used for cell reselection/handover processes are themselves conventional and may be as described in TS 25.331.

The invention, described by the exemplary embodiments may provide improved performance in the following scenarios:

3G to GSM reselection,
GSM to 3G reselection, idle mode,
GSM to 3G reselection, packet transfer mode,
3G to GSM CS handover,
3G to GSM PS handover,
GSM to 3G CS handover,
GSM to GSM handover,
GSM to GSM idle mode reselection,
GSM to GSM packet transfer mode cell change,
3G to 3G intra frequency handover,
3G to 3G inter frequency handover,
3G to 3G intra frequency reselection,
3G to 3G inter frequency reselection,
UMA wireless LAN to cellular access, and
UMA cellular to wireless LAN access.
3G UE measurement reports
3G cell search
GSM cell search Although the embodiments described relate to a 2G and 3G cellular telecommunications network, it should be understood that the invention is applicable to other radio networks—for example, WiMax, LTE/SAE and 4G cellular telecommunications networks.

Although in the embodiment the first averaging time period is set to 1 second to provide the fast filter, it should of course be understood that that value is given simply by way of example. Different values may be selected according to the circumstances. Similarly, the second averaging time period of 15 seconds is given simply by way of example to provide the slow filter. Other averaging time periods could of course be selected. However, generally, the first time period will be less than the second time period. For example, the first time period may be at least three times shorter than the second time period.

Likewise, the first "low" threshold of minus 17 dB (or −110 dBm) is provided by way of example only, and other threshold values will be selected by those skilled in the art according to the circumstances. The "high" threshold value of minus 11 dB (or −98 dBm) is also provided only by way of example, and again appropriate threshold values will be provided by way of example.

The first averaging value and the "low" threshold will generally be selected to trigger cell handover/reselection when the Ec/No or RxLev value changes rapidly to an extreme value. The second mean value and associated "high" threshold are selected to provide a slower filter and a lower threshold in order to trigger cell handover/reselection when the Ec/No or RxLev value has a wide variation amplitude but the average changes only slowly.

In the embodiments a first average time period and an associated "low" threshold is provided, and a second average time period in an associated "high" threshold is provided. More than two different averaging periods/thresholds may be provided. For example, three different averaging periods/thresholds could be provided and used to trigger cell reselection/handover. The third time period/threshold could be an intermediate time period/threshold between the first and second time periods and the "low" and "high" thresholds.

Multiple averaging time periods (filters) and thresholds could be implemented in layer 1, layer 2 or layer 3.

However many averaging time periods/filters and associated thresholds are provided, these can be operated simultaneously as in the flow charts of FIGS. 2,5 and 6, or the most appropriate one (or more) averaging period/filter and associated threshold can be selected by performing the mobility assessment, as in the FIG. 7 flow chart.

The embodiments described provide improved mobile telecommunications network performance due to better decision making, i.e. fewer dropped calls and improved call set up rate.

The present invention may provide particular benefit when a mobile terminal is camped on a 3G base station 7. It has been found that, in the prior art, the mobile terminal camped on a 3G base station 7 will sometimes perform cell reselection to a 2G base station 3, even when in a location of good 3G coverage. This has been found to be due to the random (Raleigh) fluctuation in the radio levels being insufficiently filtered in the prior art. However, in the prior art, if the filters were lengthened (slowed) to accommodate these fluctuations experienced when the mobile terminal is stationary, the response of the filter would then be too slow to detect when a mobile terminal approaches the edge of a cell in a fast moving environment, such as a mobile terminal travelling at motorway speeds. By providing multiple averaging periods/filter lengths and multiple thresholds, the present invention overcomes these deficiencies of the prior art.

The invention claimed is:

1. A method comprising:
   measuring, multiple times at a mobile terminal, a radio signal of a cell of a cellular telecommunications network on which the mobile terminal is camped;
   performing a mobility assessment of the mobile terminal within the cell and determining, based on the mobility assessment, that the mobile terminal is either fast moving or slow moving;
   calculating an average value of a plurality of the radio signal measurements of the cell over a time period, the time period being equal to:
   a first predetermined length of time if the mobile terminal has been determined to be fast moving, or
   a second predetermined length of time if the mobile terminal has been determined to be slow moving, the second predetermined length of time being longer than the first predetermined length of time; and
   comparing the calculated average value to a radio signal threshold value to determine whether or not to trigger a mobility related event, the radio signal threshold value being dependent upon the mobility assessment of the mobile terminal.

2. The method of claim 1, wherein the radio signal threshold value to which the average value is compared differs based on whether the time period equals the first predetermined length of time or the second predetermined length of time.

3. The method of claim 1, wherein the radio signal threshold value comprises a comparison value derived from a measured radio signal of another cell at the mobile terminal.

4. The method of claim 3, wherein the comparison value comprises at least one of a first average value of a plurality of radio signal measurements of the other cell over a first time period and a second average value of a plurality of the radio signal measurements of the other cell over a second time period, longer than the first time period.

5. The method of claim 1, further comprising triggering a mobility related event if the average value is less than the radio signal threshold value.

6. The method recited in claim 1, wherein the mobility related event is cell reselection of the mobile terminal or cell handover of the mobile terminal.

7. A method comprising:
   measuring, at a mobile terminal, a radio signal from a cell of a cellular telecommunications network on which the mobile terminal is camped;
   performing a mobility assessment of the mobile terminal within the cell and determining, based on the mobility assessment, that the mobile terminal is either fast moving or slow moving;
   applying a filter to the radio signal measurement to generate a filter output, the filter being:
   a fast filter if the mobile terminal has been determined to be fast moving, or
   a slow filter if the mobile terminal has been determined to be slow moving; and
   comparing the filter output to a radio signal threshold value to determine whether or not to trigger a mobility related event, the radio signal threshold value being dependent upon the mobility assessment of the mobile terminal.

8. The method of claim 7, wherein the radio signal threshold value differs based on whether the filter is a fast filter or a slow filter.

9. The method of claim 7, wherein if the filter is a fast filter, the filter and the radio signal threshold value are configured to be responsive to fast movement of the mobile terminal within the cell.

10. The method of claim 7, wherein if the filter is a slow filter, the filter and the radio signal threshold value are configured to be responsive to slow movement of the mobile terminal within the cell and to be non-responsive to Raleigh fluctuations when the mobile terminal is stationary.

11. The method of claim 7, further comprising triggering a mobility event if the filter output is less than the radio signal threshold value.

12. The method recited in claim 7, wherein the mobility related event is cell reselection of the mobile terminal or cell handover of the mobile terminal.

13. A mobile terminal comprising:
    means for measuring a radio signal of a cell at the mobile terminal;
    means for performing a mobility assessment of the mobile terminal within the cell and determining, based on the mobility assessment, that the mobile terminal is either fast moving or slow moving;
    means for calculating an average value of a plurality of radio signal measurements of the cell over a time period, the time period being equal to:
    a first predetermined length of time if the mobile terminal has been determined to be fast moving, or
    a second predetermined length of time if the mobile terminal has been determined to be slow moving, the second predetermined length of time being longer than the first predetermined length of time; and
    means for comparing the calculated average value to a radio signal threshold value to determine whether or not to trigger a mobility related event, the radio signal threshold value being dependent upon the mobility assessment of the mobile terminal.

14. The terminal of claim 13, wherein the radio signal threshold value differs based on whether the time period equals the first predetermined length of time or the second predetermined length of time.

15. The method of claim 13, further comprising means for determining the speed of the mobile terminal within the cell.

16. The method recited in claim 13, wherein the mobility related event is cell reselection of the mobile terminal or cell handover of the mobile terminal.

17. A cellular telecommunications network comprising:
    means for receiving measurements of a radio signal of a cell at a mobile terminal;
    means for performing a mobility assessment of the mobile terminal within the cell and determining, based on the mobility assessment, that the mobile terminal is either fast moving or slow moving;
    means for calculating an average value of a plurality of radio signal measurements of the cell over a time period, the time period being equal to:
    a first predetermined length of time if the mobile terminal has been determined to be fast moving, or
    a second predetermined length of time if the mobile terminal has been determined to be slow moving, the second predetermined length of time being longer than the first predetermined length of time; and means for comparing the calculated average value to a radio signal threshold value to determine whether or not to trigger a mobility related event, the radio signal threshold value being dependent upon the mobility assessment of the mobile terminal.

18. The method of claim 17, further comprising means for determining the speed of the mobile terminal within the cell.

19. A mobile terminal comprising:
means for measuring a radio signal from a cell at the mobile terminal;
means for performing a mobility assessment of the mobile terminal within the cell and determining, based on the mobility assessment, that the mobile terminal is either fast moving or slow moving;
means for applying a filter to the radio signal measurement to generate a filter output, the filter being:
a fast filter if the mobile terminal has been determined to be fast moving, or
a slow filter if the mobile terminal has been determined to be slow moving; and
means for comparing the filter output to a radio signal threshold value to determine whether or not to trigger a mobility related event in a cellular telecommunications network, the radio signal threshold value being dependent upon the mobility assessment of the mobile terminal.

20. The terminal of claim 19, wherein the radio signal threshold value differs based on whether the filter is a fast filter or a slow filter.

21. The terminal of claim 19, wherein if the filter is a fast filter, the filter and the radio signal threshold value are configured to be responsive to fast movement of the mobile terminal within the cell.

22. The terminal of claim 19, wherein if the filter is a slow filter, the filter and the radio signal threshold value are configured to be responsive to slow movement of the mobile terminal within the cell and to be non-responsive to Raleigh fluctuations when the mobile terminal is stationary.

23. The terminal of claim 19, further comprising means for triggering a mobility event if the filter output is less than the radio signal threshold value.

24. The method of claim 19, further comprising means for determining the speed of the mobile terminal within the cell.

25. A cellular telecommunications network comprising:
means for measuring a radio signal from a cell at a mobile terminal;
means for performing a mobility assessment of the mobile terminal within the cell and determining, based on the mobility assessment, that the mobile terminal is either fast moving or slow moving;
means for applying a filter to the radio signal measurement to generate a filter output, the filter being:
a fast filter if the mobile terminal has been determined to be fast moving, or
a slow filter if the mobile terminal has been determined to be slow moving; and
means for comparing the filter output to an a radio signal threshold value to determine whether or not to trigger a mobility related event in the network.

26. The method of claim 25, further comprising means for determining the speed of the mobile terminal within the cell.

* * * * *